United States Patent
Bourne et al.

(10) Patent No.: US 6,884,960 B2
(45) Date of Patent: Apr. 26, 2005

(54) METHODS FOR CREATING OPTICAL STRUCTURES IN DIELECTRICS USING CONTROLLED ENERGY DEPOSITION

(75) Inventors: Orson Bourne, Orleans (CA); David Rayner, Ottawa (CA); Paul Corkum, Gloucester (CA); Manjusha Mehendale, Somerset, NJ (US); Andrei Yu Naumov, Kanata (CA)

(73) Assignee: National Research Council of Canada, Ottawa (CA)

( * ) Notice: Subject to any disclaimer, the term of this patent is extended or adjusted under 35 U.S.C. 154(b) by 50 days.

(21) Appl. No.: 10/362,223

(22) PCT Filed: Aug. 21, 2001

(86) PCT No.: PCT/CA01/01174

§ 371 (c)(1),
(2), (4) Date: Jun. 16, 2003

(87) PCT Pub. No.: WO02/16070

PCT Pub. Date: Feb. 28, 2002

(65) Prior Publication Data

US 2004/0094527 A1 May 20, 2004

Related U.S. Application Data

(60) Provisional application No. 60/226,587, filed on Aug. 21, 2000, and provisional application No. 60/279,712, filed on Mar. 30, 2001.

(51) Int. Cl.$^7$ ............................................. B23K 26/00
(52) U.S. Cl. ............................ 219/121.69; 219/121.75
(58) Field of Search ........................ 219/121.68, 121.69, 219/121.73, 121.75, 121.78, 121.79, 121.81, 121.85

(56) References Cited

U.S. PATENT DOCUMENTS 6,642,480 B1 * 11/2003 Amako et al. .......... 219/121.75
6,710,901 B1 * 3/2004 Pastor ........................... 359/4

FOREIGN PATENT DOCUMENTS

WO     WO 01/09899 A1     2/2001

OTHER PUBLICATIONS

Brodeur et al., "Band–Gap Dependence of the Ultrafast White–Light Continuum", Physical Review Letters, The American Physical Society, USA, vol. 80, No. 20, pp. 4406–4409, XP002231510, May 18, 1989.

Brodeur et al., "Ultrafast White–Light Continuum Generation and Self–Focusing in Transparent Condensed Media", Journal of the Optical Society of America B (Optics Physics), USA, vol. 16, No. 4, pp. 637–650, XP002231514, Apr. 1999.

(Continued)

Primary Examiner—Samuel M. Heinrich
(74) Attorney, Agent, or Firm—Freedman & Associates

(57) ABSTRACT

The present invention relates to a method for writing an optical structure within a workpiece of a dielectric material using FLDM. In a first embodiment system parameters for the FLDM are determined in dependence upon the dielectric material, a predetermined volume element and a predetermined change of the refractive index of the dielectric material within the predetermined volume element. The system parameters are determined such that self-focusing of a pulsed femtosecond laser beam is inhibited by non-linear absorption of the energy of the pulsed femtosecond laser beam within the dielectric material. A pulsed femtosecond laser beam based on the determined system parameters is focused at a predetermined location within the workpiece for inducing a change of the refractive index through dielectric modification within the predetermined volume element, the volume element including the focus. Various embodiments enable writing of various different optical structures into a workpiece.

10 Claims, 9 Drawing Sheets

Workpiece motion

OTHER PUBLICATIONS

Davis et al., "Writing Waveguides in Glass with a Femtosecond Laser", Optics Letters, Optical Society of America, USA, vol. 21, No. 21, pp. 1729–1731, XP002231513, Nov. 1996.

Efimov et al., "Color–Center Generation in Silicate Glasses Exposed to Infrared Femtosecond Pulses", Journal of the Optical Society of America B (Optical Physics), USA, vol. 15, No. 1, pp. 193–199, XP002231515, Jan. 1998.

Efimov et al., "Photoionization of Silicate Glasses Exposed to IR Femtosecond Pulses", Journal of Non–Crystalline Solids, North–Holland Physics Publishing, Amsterdam NL, vol. 253, No. 1–3, pp. 58–67, XP004364221, Aug. 1999.

Gaeta "Catastrophic Collapse of Ultrashort Pulses", Physical Review Letters, American Physical Society, USA, vol. 84, No. 16, pp. 3582–3585, XP002231511, Apr. 17, 2000.

Miura et al., "Photowritten Optical Waveguides in Various Glasses with Ultrashort Pulse Laser", Applied Physics Letters, American Institute of Physics, New York USA, vol. 71, No. 23, pp. 3329–3331, XP001104579, Dec. 8, 1997.

Naumov et al., "Microrestructing with Femtosecond Laser Inside Silica Glasses", Technical Digest: Summaries of Papers Presented at the Conference on Lasers and Electro–Optics, Post–conference Edition, CLEO '99, Washington DC USA, XP002231516, 1999.

Schaffer et al., "Micromachining Optical Waveguides in Bulk Glass Using a Femtosecond Laser Oscillator", Conference on Lasers and Electro–Optics 2000 (CLEO 2000), Post–conference Edition, TOPS vol. 39, San Francisco USA, vol. 39, pp. 375–376, XP002231512, 2000.

* cited by examiner

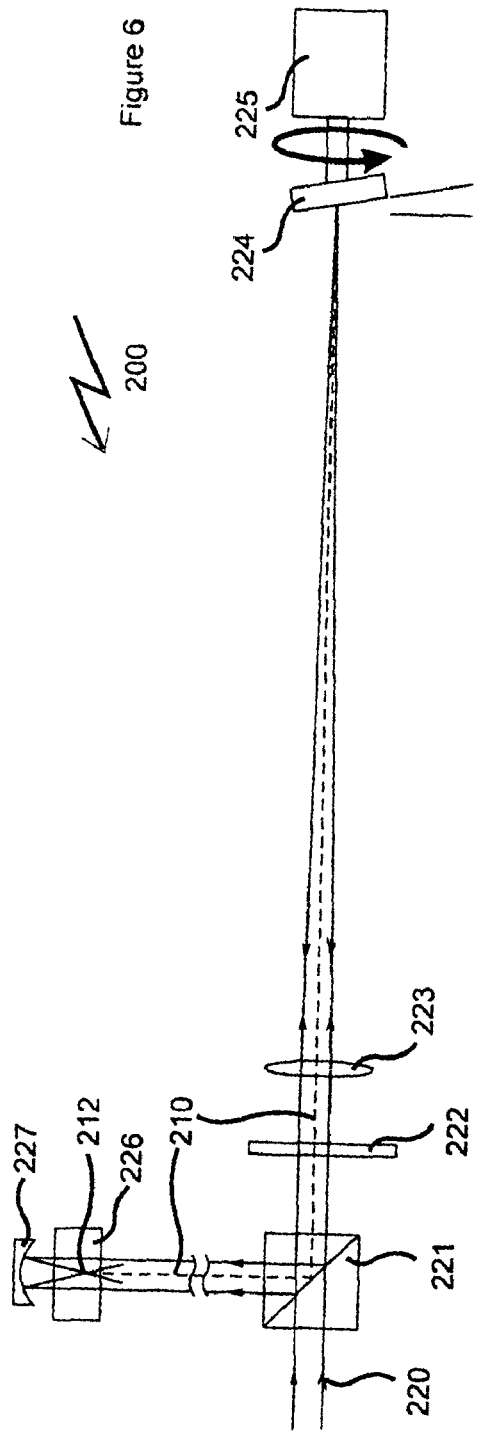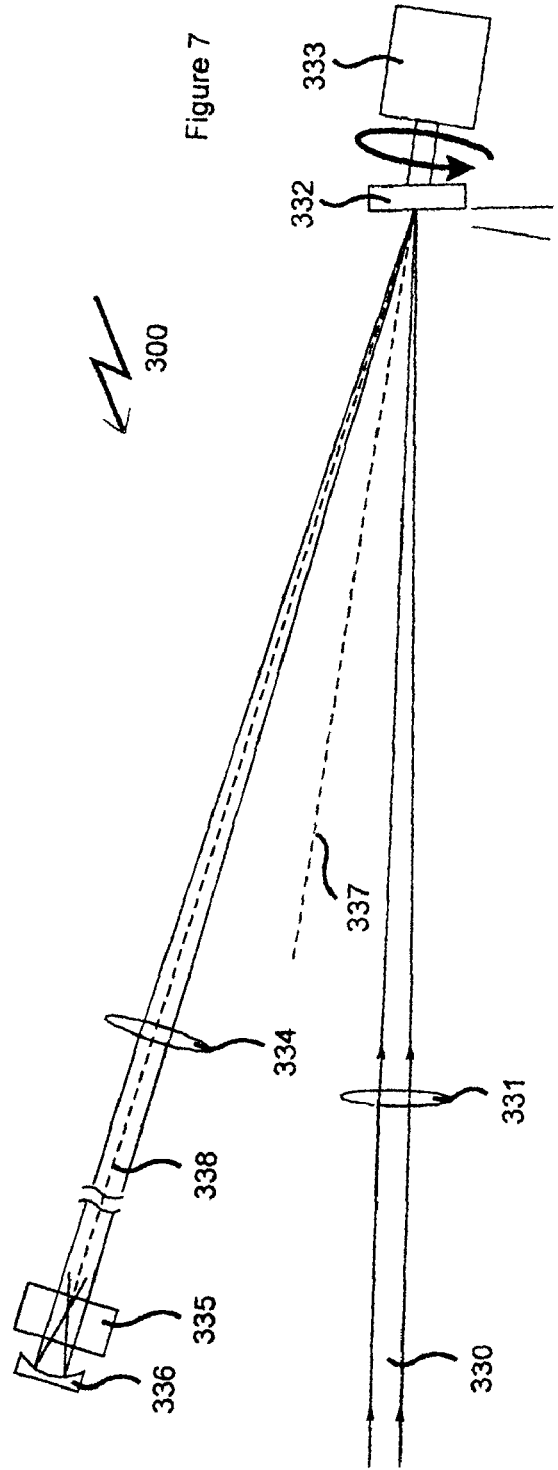

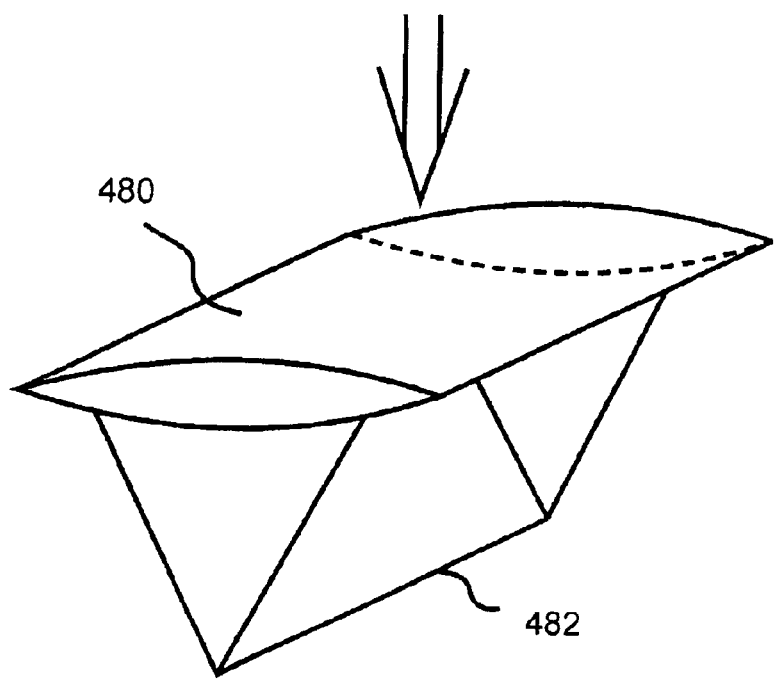
Figure 11a
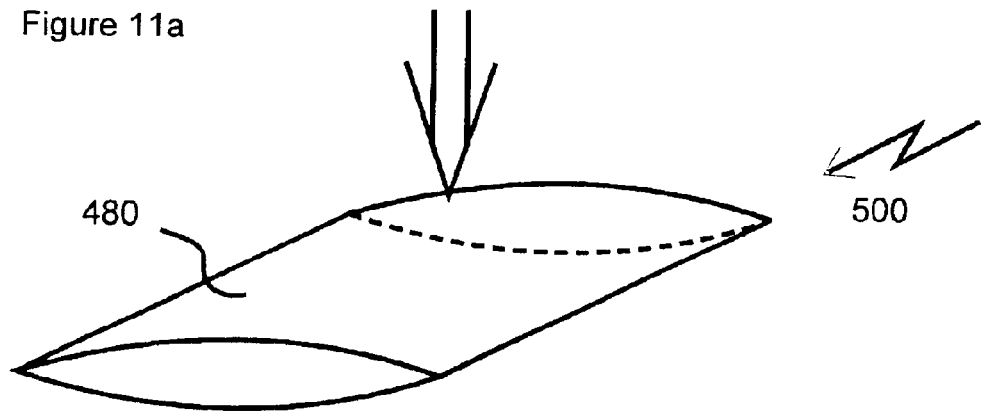
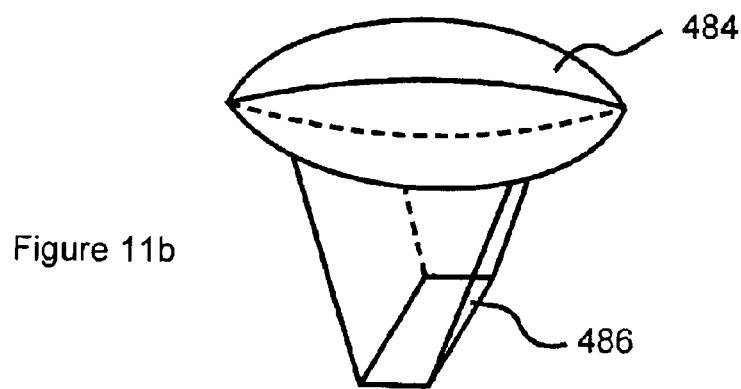
Figure 11b

METHODS FOR CREATING OPTICAL STRUCTURES IN DIELECTRICS USING CONTROLLED ENERGY DEPOSITION

This application is a 371 of PCT/CA01/01174 filed Aug. 21, 2001 which claims priority from U.S. Provisional Patent Application No. 60/226,587 filed Aug. 21, 2000 and U.S. Provisional Patent Application No. 60/279,712 filed Mar. 30, 2001.

FIELD OF THE INVENTION

The invention relates generally to fabricating optical structures using femtosecond laser pulses, and more specifically to methods and devices for fabricating optical structures within dielectrics by locally modifying the refractive index of the dielectric using controlled energy deposition.

BACKGROUND OF THE INVENTION

In the past two decades there has been an increasing interest in the use of lasers in material processing applications. Recent developments of pulsed laser technology have been lasers producing laser pulses of extreme high intensity—in the order of Giga Watts—combined with a very short pulse length—in the order of femtoseconds. The combination of high pulse intensity and very short pulse length allows very precise and localized material processing. The intensity is high enough to cause physical effects in a volume element encompassing the focus of the laser beam resulting in permanent changes of the affected material or ablation at the surface. However, the pulse length is short enough to limit the energy transmitted in a pulse such that the material in the vicinity of the focus is able to absorb the same without suffering serious damage. Applications of femtosecond laser pulses in material processing are disclosed in U.S. Pat. No. 5,656,186 issued to Mourou et al. in Aug. 12, 1997, and in U.S. Pat. No. 6,156,030 issued to Neev in Dec. 5, 2000.

Recently, it has been recognized that femtosecond laser pulses allow modifying the refractive index inside dielectric materials on a microscopic scale. This leads to the possibility of writing optical structures such as waveguides inside transparent materials as shown in:

K. M. Davis, K. Miura, N. Sugimoto, and K. Hirao, Opt. Lett. 21, 21 (1996);

K. Miura, H. Inouye, J. Qiu, T. Mitsuyu, K. Hirao, NIM B, 141 (1998);

K. Hirao and K. Miura, J. Non-Crys. Solids 91, 235 (1998);

S. H. Cho, H. Kumagai, K. Midorikawa, M. Obara, SPIE'99, SPIE Vol. 3618;

C. B. Schaffer, A. Brodeur, J. F. Garcia and E. Mazur, Opt. Lett. 93, 26 (2000);

D. Homoelle, S. Wielandy, A. I. Gaeta, N. F. Borrelli and C. Smith, Opt. Lett. 1311, 24 (1999);

L. Sudrie, M. Franco, B. Prade and A. Mysyrowicz, Opt. Comm. 279, 171 (1999); and, A. Yu. Naumov, C. Przygodzki, X. Zhu, P. B. Corkum, CLEO'99, CThC2, p356.

It is generally assumed that in the paraxial limit laser beams with a power greater than the self-focusing power must always self-focus and that the loss of control over beam propagation resulting from self-focusing make controlled energy deposition through multiphoton ionization difficult, if not impossible. Numerous articles have been published considering this phenomenon:

A. Yariv, Quantum Electronics (Wiley, New York, 1975);

Y. R. Shen, Prog. Quantum Electron. 4, 1 (1975);

J. H. Marburger, Prog. Quantum Electron. 4, 35 (1975);

J. Ranka, R. W. Schirmer, and A. Gaeta, Phys. Rev. Lett. 77, 3783 (1996);

J. F. Lami, S. Petit, and C. Hirlimann, Phys. Rev. Lett. 82, 1032 (1999);

A. Zozulya, S. Diddams, A. V. Engen, and T. S. Clement, Phys. Rev. Lett. 82, 1430 (1999);

Gaeta, Phys. Rev. Lett. 84, 3582 (2000);

J. Rothberg, Opt. Lett. 17, 583 (1992);

D. Strickland and P. Corkum, J. Opt. Soc. Am. B 11, 492 (1994); and,

G. G. Luther, J. V. Moloney, A. C. Newell, and E. M. Wright, Opt. Lett. 19, 862 (1994).

It would be advantageous to control the energy deposition process in Femtosecond Laser Dielectric Modification (FLDM), in particular, at intensities higher than the threshold for self-focusing in the material. This would allow achieving controlled energy deposition with high precision, which is needed to produce useable optical structures. Furthermore, it would be advantageous to have a method for modeling the plasma distribution induced through non-linear absorption of a femtosecond laser pulse and predicting the energy transmitted through the focus. This would enable reproducible manufacture of optical structures used, for example, in fiber optic networks.

It is, therefore, an object of the invention to provide a method for modeling the plasma distribution induced through non-linear absorption of a femtosecond laser pulse and predicting the energy transmitted through the focus.

It is further an object of the invention to provide methods and devices for manufacturing optical structures using FLDM.

SUMMARY OF THE INVENTION

Controlled energy deposition modifies the refractive index of a dielectric material at predetermined locations within a workpiece in a very localized manner without damaging the material in adjacent areas. This allows, for example writing of waveguides within a workpiece of a dielectric material resulting in highly integrated optical structures.

In accordance with an aspect of the present invention there is provided a method for writing an optical structure within a workpiece of a dielectric material using FLDM comprising the steps of:

determining system parameters for the FLDM in dependence upon the dielectric material, a predetermined volume element and a predetermined change of the refractive index of the dielectric material within the predetermined volume element, wherein the system parameters are determined such that self-focusing of a pulsed femtosecond laser beam is inhibited by non-linear absorption of the energy of the pulsed femtosecond laser beam within the dielectric material;

providing the workpiece; and, providing the pulsed femtosecond laser beam based on the determined system parameters, the laser beam being focused at a predetermined location within the workpiece for inducing a change of the refractive index through dielectric modification within the predetermined volume element, the volume element including the focus.

In accordance with the present invention there is provided a method for focusing a laser beam;

providing the workpiece at a predetermined location such that the focus of the laser beam is located within the workpiece;

providing a reflective optical element for reflecting the laser beam onto the focusing optical element, the reflective optical element being movable for providing a predetermined movement of the focus of the laser beam in at least one direction with respect to the workpiece;

providing a drive mechanism for moving the reflective optical element; and, providing a laser beam onto the reflective optical element for predetermined movement of the focus in order to change the refractive index of the dielectric material within a volume element encompassing the focus at predetermined positions within the workpiece.

In accordance with the present invention there is further provided a method for writing an optical structure in close proximity to a surface of a workpiece of a dielectric material using FLDM comprising the steps of:

providing the workpiece;

providing another piece of an optically same material, the other piece being in optical contact with the surface of the workpiece;

providing a pulsed femtosecond laser beam, the laser beam being focused at a predetermined location in close proximity to the surface of the workpiece for inducing a change of the refractive index through dielectric modification within a predetermined volume element encompassing the focus, wherein at least a portion of the energy of the pulsed femtosecond laser beam is absorbed by the material of the other piece.

In accordance with the present invention there is yet further provided a method for writing an optical structure having a predetermined profile within a workpiece of a dielectric material using FLDM comprising the steps of:

providing an optical system for shaping the focus of a laser beam such that a predetermined volume element of dielectric modification within the dielectric material is obtained;

providing the workpiece at a predetermined location such that the focus of the laser beam is located within the workpiece;

providing a femtosecond laser beam; and, providing relative movement between the workpiece and the focus of the laser beam, wherein an angle Θ between the direction of the movement and an axis of the shaped laser focus is determined such that the predetermined profile of the optical structure is obtained.

In accordance with another aspect of the present invention there is provided a growing a first thin film on the first substrate, the first thin film having a refractive index smaller than a known upper limit;

patterning first optical structures within the first thin film by altering the refractive index of the first thin film at predetermined locations using FLDM;

growing a second thin film on the first substrate, the first thin film having a refractive index smaller than a known upper limit;

patterning second optical structures within the second thin film by altering the refractive index of the second thin film at predetermined locations using FLDM; and, patterning third optical structures for coupling the first optical structures and the second optical structures by altering the refractive index of the first thin film and the second thin film at predetermined locations using FLDM.

BRIEF DESCRIPTION OF THE FIGURES

Exemplary embodiments of the invention will now be described in conjunction with the following drawings, in which:

FIG. 6 is a simplified block diagram illustrating an optical system according to the invention for writing waveguides having a larger width by rotating a focal spot around the writing axis;

FIG. 7 is a simplified block diagram illustrating another embodiment of the optical system according to the invention shown in FIG. 6;

FIG. 11A is a simplified block diagram illustrating a line focus obtained by using a cylindrical lens;

FIG. 11B is a simplified block diagram illustrating an optical arrangement for producing a desired focus according to the invention;

DETAILED DESCRIPTION OF PREFERRED EMBODIMENTS

In the paraxial limit, c.w. laser beams having a power greater than the self-focusing power always self-focus. It is generally assumed in the prior art that a loss of control over beam propagation implied by the self-focusing make controlled energy deposition through multiphoton ionization difficult, if not impossible. With ultra-short pulses, the instability is both spatial and temporal.

Inventors have found that high order nonlinear absorption in dielectrics inhibits the self-focusing process of a laser beam allowing efficient and controllable energy deposition in transparent dielectrics even when the pulse power exceeds the self-focusing threshold.

The phenomenon of controlled self-focusing through nonlinear absorption in dielectrics will be described in the following. Significant changes to the laser beam due to self-focusing and self-phase modulation requires an accumulated phase retardation $\delta\Phi$ of the beam due to the non-linear index of refraction of the dielectric to exceed $\pi$, i. e. $\delta\Phi=2\pi\int\eta_2 E^2 dl/\lambda < \pi$. For a small path length I the integral only becomes large if $E^2$ becomes large. However, high order nonlinear absorption effects in dielectrics become dominant before this happens. The magnitude of the laser field in the dielectric is restricted by the nonlinear absorption. Therefore, the integral does not become large, i.e. neither temporal nor spatial collapse is possible.

Figure 1:
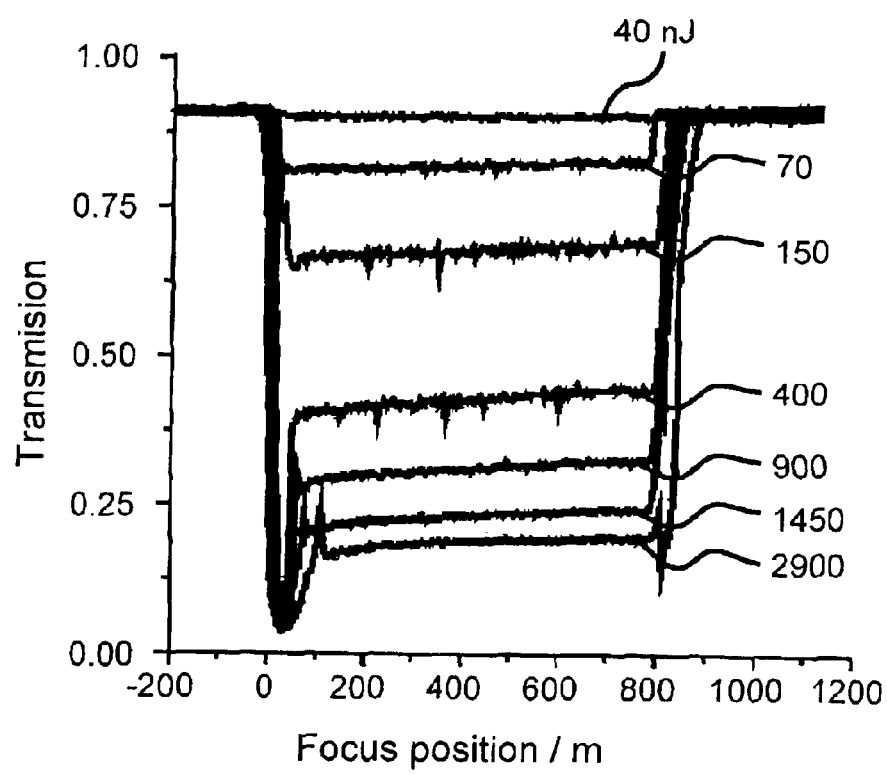
FIG. 1 illustrates the rate of transmission of a high intensity femtosecond laser pulse through a 0.8 mm thick glass sample as a function of focal position.
Figure 2:
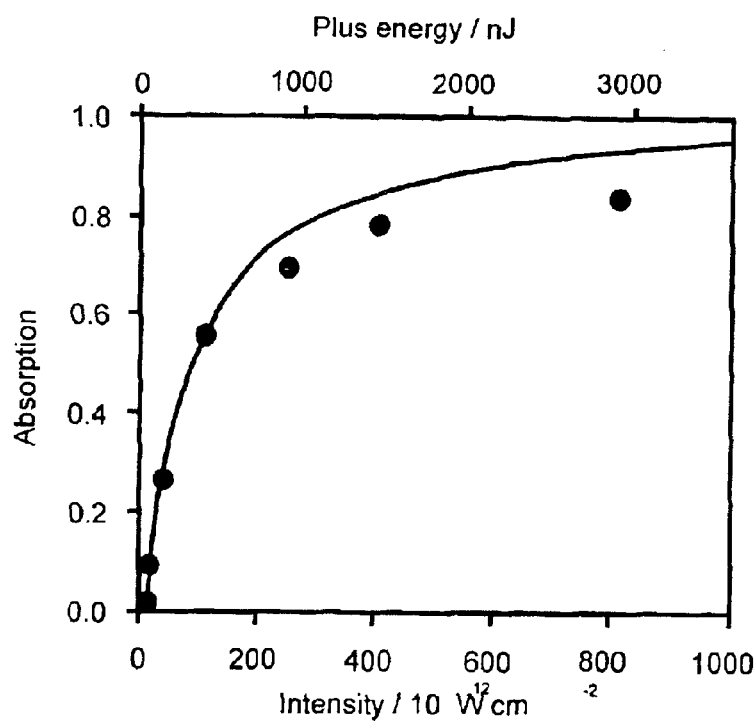
FIG. 2 illustrates the rate of absorption as a function of laser pulse intensity when the focus was centered in the glass sample.

FIG. 1 shows results of experiments which measured the transmitted energy of a high intensity femtosecond laser pulse as a function of the distance between the beam waist and the front surface of a 0.8 mm thick glass sample. Traces are shown for pulse energies of 40, 70, 150, 400, 900, 1450, and 2900 nJ. The higher the pulse energy the greater is the absorption indicated by the lower transmission rate. A sharp decrease in transmission near the front surface at high intensities corresponds to surface plasma formation and nearly complete absorption of the pulse at the surface. When the focus is inside the sample the absorption is independent of its position. When the focus moves outside the sample at 800 $\mu$m, 100% transmission is recovered. As shown in FIG. 2 absorption in the dielectric material is strongly non-linear and starts to saturate at pulse energies of approximately 2 $\mu$J, which corresponds to an intensity of $5.6\times10^{14}$ W cm$^{-2}$. The transmission losses are nearly independent on the position inside the sample. Since linear absorption is negligible in this spectral region the transmission losses are caused by multiphoton absorption. However, breakdown through self-focusing has not been observed inside the glass sample at intensities high enough to cause breakdown in the material resulting in ablation on the front or back surface of the glass sample when the focus was in front or in the back of the sample. FIG. 2 shows the absorption as a function of the laser pulse energy. The absorption rises rapidly before saturating at high energy. The absorption commences at an intensity close to a 40 nJ threshold for surface damage. The beam intensity at threshold is approximately $1.1\times10^{13}$ W cm$^{-2}$.

Figure 3:
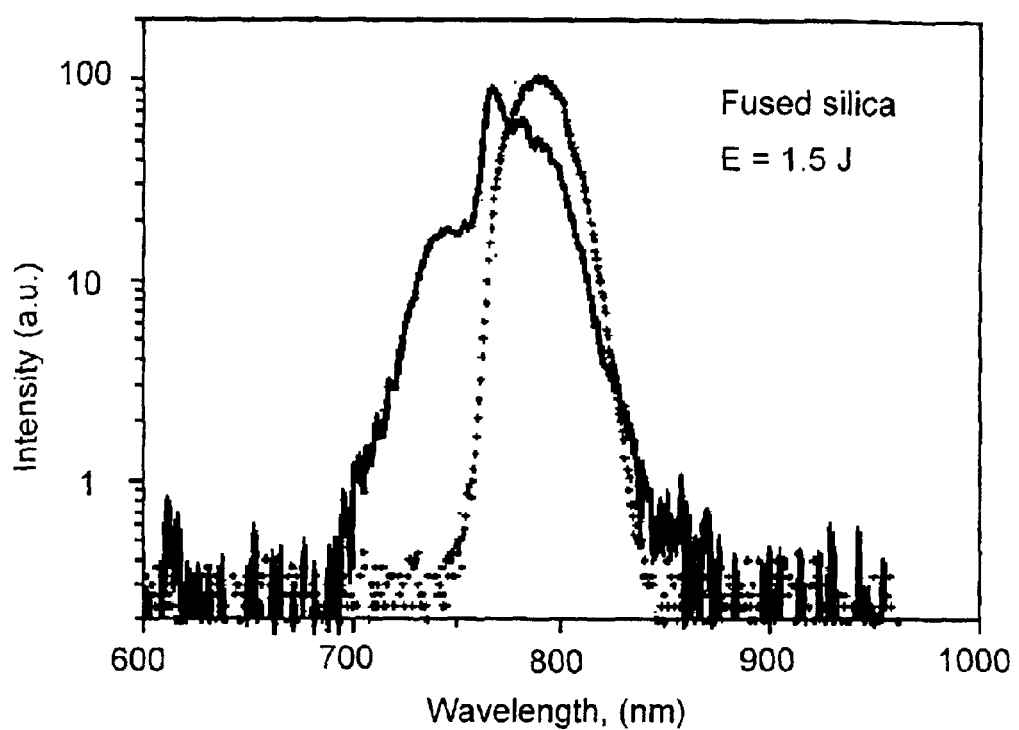
FIG. 3 illustrates a comparison of the spectrum of a femtosecond laser pulse having 15 times the critical intensity for self-focusing in the material after transmission through a focus in fused silica with the spectrum of the same prior entering the sample.

In the following it will be shown that the beam is not undergoing catastrophic self-focusing. It is estimated that the critical power for self-focusing occurs for an energy of approximately 100 nJ, an energy at which there is already strong absorption. FIG. 3 shows a comparison of a spectrum of a high energy femtosecond laser pulse—1.5 $\mu$J —after transmission through a focus in fused silica—solid line— with the spectrum of the pulse prior to entering the sample— dotted line. The spectrum of the transmitted pulse is slightly broadened with respect to the spectrum of the incident pulse and shifted predominantly to the blue indicating plasma formation. The little spectral broadening is a direct measure for the limitation of the self-focusing process in the dielectric since self-focusing does not occur without considerable spectral broadening.

Nonlinear absorption of laser pulses of less than ~10 ps in duration by a dielectric is understood in terms of a multiphoton photoionization seeded avalanche process as shown in B. Stuart, M. Feit, S. Herman, A. Rubenchik, B. Shore, and M. Perry, J. Opt. Soc. Am. B 13, 459 (1996). This process is represented by the rate equation $dn/dt=\alpha I(t)n+P(I)$ where n is the free carrier density, a is the avalanche rate, $I(t)$ is the laser intensity and $P(J)$ is the direct multi-photon photoionization rate, which is usually determined based on a perturbation or tunneling theory. With decreasing laser pulse length the relative contribution to the free carrier density n of the photoionization $P(I)$ compared to the avalanche ionization $\alpha I(t)n$ increases. Therefore, the photoionization dominates for short laser pulses. M. Lenzner, L. J. Kruger, S. Sartania, Z. Cheng, C. Spielmann, L. G. Mourou, W. Kautek, and F. Krausz, Phys. Rev. Lett. 80, 4076 (1998) have reported optical breakdown in borosilicate glass to be dominated by photoionization for a laser pulse duration below 100 fs whereas fused silica shows an avalanche contribution for laser pulses down to 10 fs. The critical carrier density for optical breakdown is approximately $10^{21}$ cm$^{-3}$. The contribution of the avalanche ionization is even less for carrier densities below this level. It is, therefore, a reasonable assumption for analyzing the nonlinear absorption of laser pulses having a duration of the order of tens of femtoseconds or less in a dielectric to consider the absorption to be dominated by the photoionization $P(I)$. This results in a relatively simple model demonstrating the self-inhibition of the self-focusing process. The photoionization process is highly nonlinear and its intensity dependence is best approximated by a step function. It is possible to describe the process assuming that intensities above a threshold intensity $I_{th}$ are absorbed and the intensity of the laser pulse is modified—"trimmed" in time and spatial distribution by this process as it propagates through the focus. That is, the peak intensity of the laser pulse, which would otherwise grow according to the confocal parameters, is continually trimmed to a flat top intensity $I_{th}$ as it approaches the focus. Based on this assumption, the intensity dependence of the total energy $E_A$ absorbed from the laser pulse is equivalent to the energy that would have been absorbed at the focal plane had the laser pulse arrived there without prior attenuation. Assuming a laser pulse having a Gaussian distribution in space—radius—and time, integration over these two variables leads to the expression for the absorption A, $$A = \frac{E_A}{E_0} = \left\{\text{erf}\left(\sqrt{\ln\frac{I_0}{I_{th}}}\right) - \frac{2}{\pi}\frac{I_{th}}{I_0}\left(1+\frac{2}{3}\ln\frac{I_0}{I_{th}}\right)\sqrt{\ln\frac{I_0}{I_{th}}}\right\} \quad (1)$$

Here $E_0$ is the incident laser pulse energy and $I_0$ is the incident laser peak intensity —$I_0=E_0/(\pi^{2/3}\omega^2\tau)$ with $\omega$ being the beam radius at the focus and $\tau$ being the temporal half-width of the laser pulse at $I_0/e$.

The solid line in FIG. 2 is the result of fitting the lower intensity absorption results for Pyrex glass to Eq. 1 by varying $I_{th}$, resulting in $I_{th}=9.8\times10^{12}$ W cm$^{-2}$. This corresponds to an experimental pulse energy threshold of 35 nJ. The model fits the experimental results well up to intensities of ~$100\times10^{12}$ W cm$^{-2}$ (~400 nJ/pulse) or $10\times I_{th}$. The departure of the experimental results from the calculated results at high intensities is due to the effect of the plasma lens refocusing the beam resulting in reduced absorption.

The experiments show the control of the absorption process which is evident from the maximum absorbed energy density, which, for instance, only increased by a factor of 2.4 when the pulse energy was increased by a factor of 10 from 0.1 to 1 µJ. The maximum energy density point is located before the focus and the energy density distribution, and therefore the interaction region, is foreshortened in the beam direction compared to the intensity distribution in the unmodified beam through the focus. At a pulse energy of 100 nJ, the energy corresponding to the critical power for self-focusing, the model predicts carrier densities of up to $2.5 \times 10^{20}$ W cm$^{-2}$ showing that plasma formation is well established before this limit is reached.

Furthermore, numerical analysis has been performed to confirm that the simple threshold model provides an adequate description of the absorption process where photoionization dominates and to investigate the contribution of the avalanche ionization. A comparison with the numerical results indicates only small differences in the predicted free carrier spatial distributions.

Figure 4:
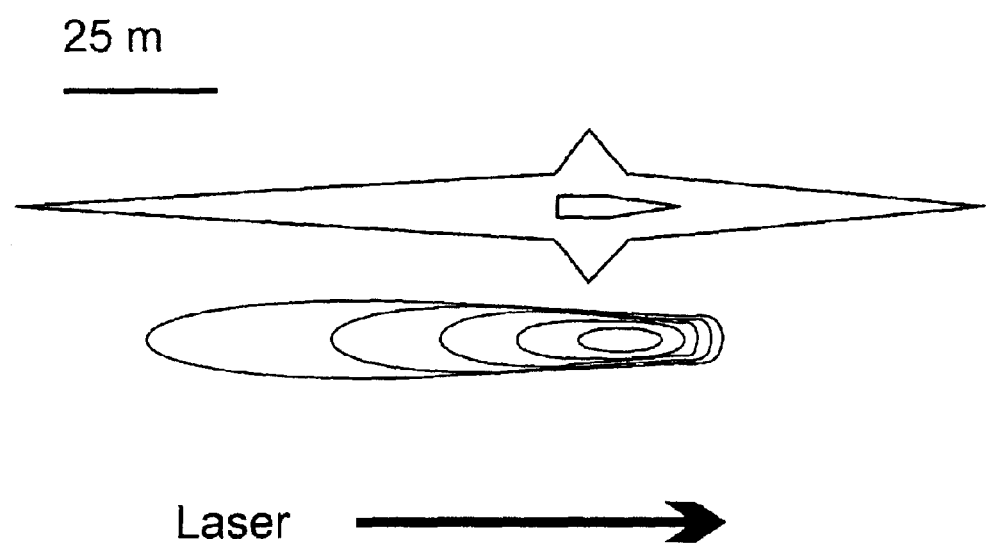
FIG. 4 is an outline of a region of dielectric modification after an optical micrograph showing dielectric modification inside a glass sample compared with contours depicting the plasma density as predicted by the method according to the invention.

FIG. 4 shows schematically an outline of the region of refractive index modification following femtosecond laser irradiation of a glass sample. It is evident that the energy desposition is asymmetric about the focal plane with a larger volume being modified on the side closer to the laser. The inside spot corresponds to the volume close to the focus where the plasma is located and where the refractive index is modified significantly. Also shown are contour plots of the free carrier density predicted by the threshold model. There is a strong correspondence between the shape of the volume where the refractive index is modified and the plasma density as predicted by the model.

The threshold model provides a simple method for determining controlled energy deposition in order to predictably modify dielectric properties inside a sample material or workpiece at energy levels higher than the threshold for self-focusing in the material. The method is highly advantageous for reproducibly manufacturing optical components using controlled energy deposition by allowing modelling of the plasma distribution and predicting the energy transmitted through the focus. Furthermore, the model allows predetermining the energy extracted from the laser beam to stabilize self-focusing by energy depletion and plasma formation. The extracted energy is determined such that the material is not catastrophically damaged. The low-density plasma causes a non-linear ionization in dielectrics resulting in a refractive index modification.

Controlled energy deposition gently modifies the dielectric properties of the material allowing refractive structures to be written in the dielectric.

Furthermore, by actively and nondestructively injecting free carriers into transparent dielectrics activity is introduced into the dielectrics. Since energy depletion plays such an important role, increasing the fluence in the beam leads to a near-linear increase in the number of free carriers as if the absorption was due to a low order non-linearity. This raises the potential of free carriers in dielectrics to serve as a femtosecond optical switch for visible radiation.

In the following various applications of FLDM will be disclosed. As will become apparent to those of skill in the art, use of the method for determining controlled energy deposition according to the invention is highly advantageous in these applications.

FLDM is a highly non-linear process requiring tightly focusing of the laser beam in the material. Using a lens system such as a microscope objective for focusing a femtosecond laser pulse into a workpiece as shown in the prior art generally has the disadvantage of a very short working distance permitting only dielectric modification to a depth of a few mm. Greater depths using a lens system are only achieved with specialized microscope objectives of very high quality and, therefore, at a very high cost.

Figure 5A:
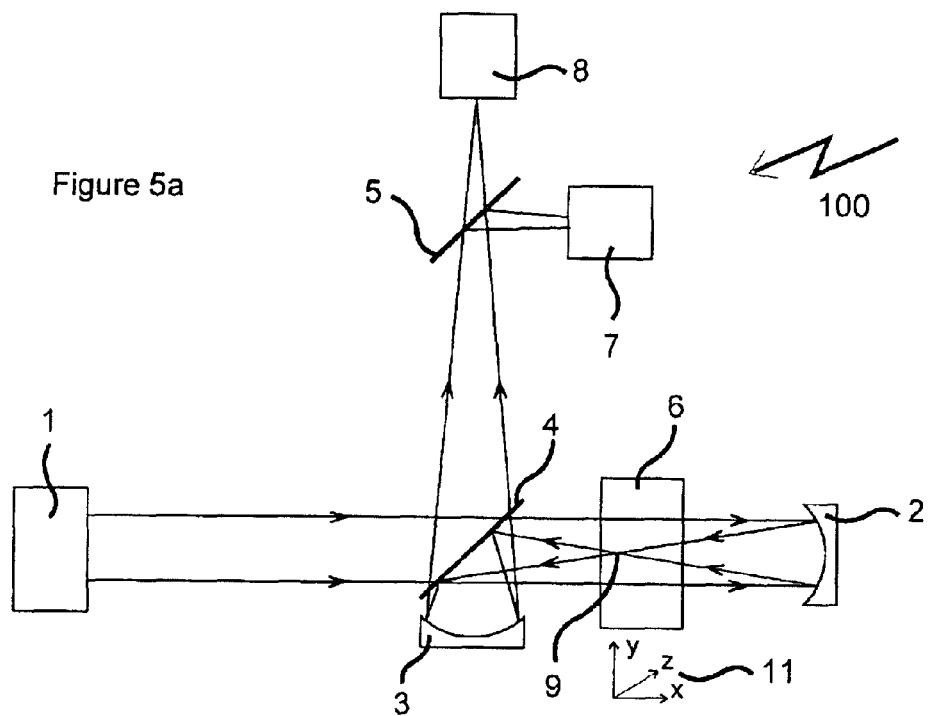
FIG. 5A is a simplified block diagram illustrating a manufacturing device according to the invention allowing dielectric modification in a thick block of a dielectric material.

Referring to FIG. 5A a manufacturing device 100 according to the invention allowing dielectric modification in a thick block of a dielectric material, for example, writing long waveguides is illustrated. Use of reflective large aperture optics provide a large focal length for tightly focusing a pulsed writing laser beam, thereby allowing for a long working distance. A femtosecond laser pulse is transmitted through a first beam splitter 4 and through a work piece 6 of dielectric material. After transmission through the work piece 6 the femtosecond laser pulse is reflected off a first concave mirror 2 and focussed into the workpiece 6 at a predetermined location within the workpiece 6. After passing through focus 9 the now diverging laser pulse is reflected off the first beam splitter 4 onto a second concave mirror 3. The diverging laser pulse is focussed again upon reflection off the second concave mirror 3 onto a power meter 7 and a CCD camera 8. A first portion of the laser pulse is transmitted through a second beam splitter 5 impacting on the CCD camera 8 and a second portion of the laser pulse is reflected onto the power meter 7.

Linear waveguides are fabricated, for example, by moving the workpiece 6 along the z-axis using a micropositioner 11. Alternatively, more complex waveguide patterns are written within the workpiece 6 by combined motion in x, y, and z-direction.

The first concave mirror 2 is dimensioned such that a long working distance is provided, thereby allowing tightly focusing of the laser pulse at a variety of depths within the workpiece 6. Propagating the laser pulse through the workpiece 6 introduces added dispersion into the optical path of the laser pulse. This added dispersion is compensated for by adjusting a pulse compressor of the femtosecond laser 1 to pre-compensate the pulse such that the laser pulse width is minimized when the focus is in the center of the workpiece 6. Using a 50 fs pulse of a femtosecond laser source 1 is sufficient for writing depths up to 15 mm. Larger writing depths are achieved by adjusting the pulse compressor of the femtosecond laser source during the writing process.

The beamsplitters 4 and 5 as well as the concave mirror 3 are system components used for diverting the laser pulse after passing through the focus allowing for active monitoring of the waveguide manufacturing process. For example, the CCD camera 8 provides information about the location of the focus during the writing process and the power meter 7 monitors the transmitted light intensity providing further feedback to control the FLDM process.

Figure 5B:
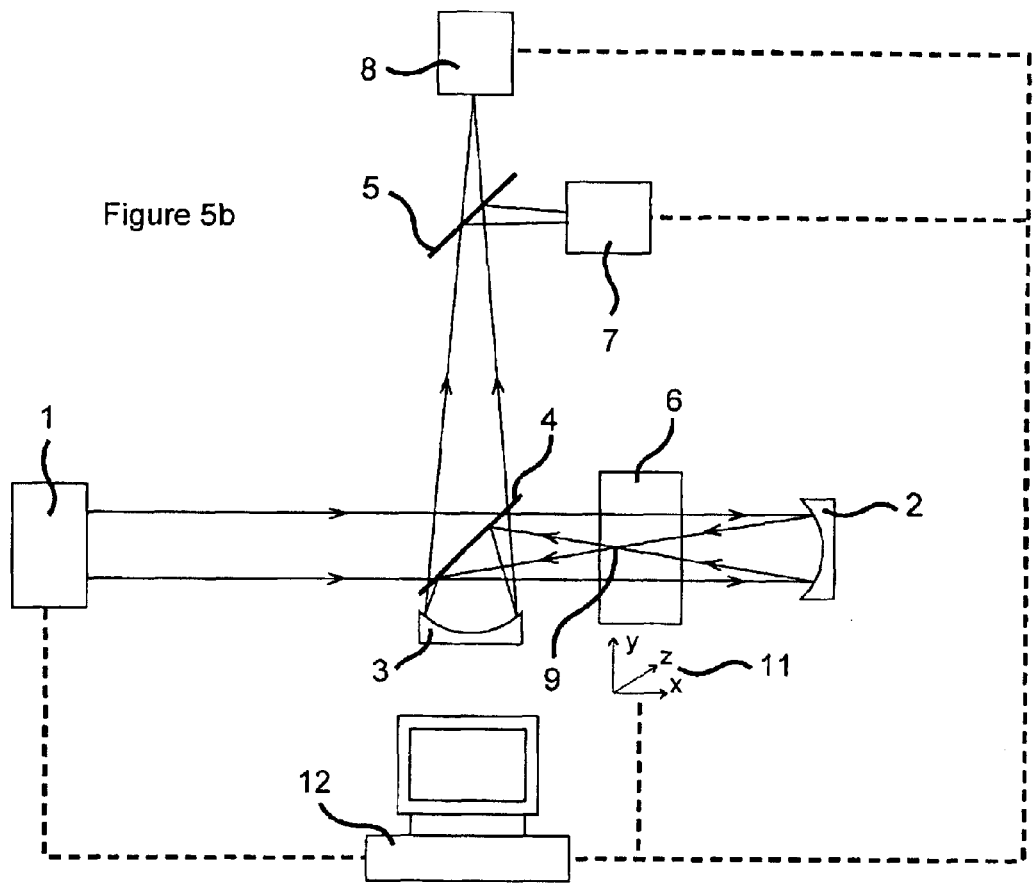
FIG. 5B is a simplified block diagram illustrating an embodiment of the manufacturing device according to the invention shown in FIG. 5A.

Optionally, connecting the femtosecond laser source 1, the micropositioner 11, the powermeter 7 and the CCD camera 8 to a computer, as shown in FIG. 5B allows fully automated production of waveguides within the workpiece 6. For example, according to the feedback from the power meter 7 and the CCD camera 8 the computer determines the adjustment of the workpiece 6 with respect to the focus 9 and controls the micropositioner 11 in dependence thereupon. Furthermore, according to the position of the focus within the workpiece 6 the computer provides a signal to the femtosecond laser source 1 to adjust the pulse compressor. Further steps of automatization comprise computer controlled manufacturing of waveguides using, for example, Computer Aided Manufacturing CAM and integration of the method for determining controlled energy deposition providing a computer controlled manufacturing process linking the design of an optical component and its manufacturing.

Figure 5C:
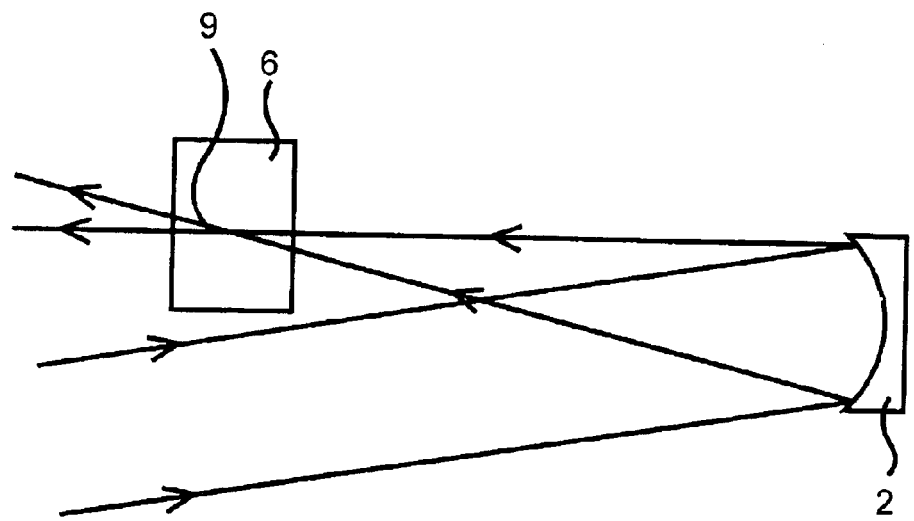
FIG. 5C is a simplified block diagram illustrating another embodiment of the manufacturing device according to the invention shown in FIG. 5A.

In an alternative embodiment, illustrated in FIG. 5C, the concave mirror 2 is used as an off axis mirror. Here, the laser pulse is not transmitted through the workpiece prior focusing at the expense of a more difficult optical alignment due to the use of the off axis mirror.

The ability to control the energy deposition through the absorption of focused femtosecond laser pulses in dielectrics is limited because the intensity of the laser pulse has to be within a range—high enough for the self-inhibiting non-linear absorption mechanism to operate but lower than the limit where catastrophic damage takes place. Therefore, it is not possible to produce large patterns within a workpiece by simply using a laser producing a pulse having higher power and focusing more loosely such that a larger focus volume is obtained. For a given laser pulse width there is a power threshold restricting the size of writable patterns. For example, using 50 fs pulses limits the width of a waveguide to <8 microns, which is insufficient for efficient waveguides operating in the near infrared. Since self-focusing scales with $1/\lambda^2$ whereas the non-linear interaction of the FLDM is essentially independent of the wavelength fabrication of larger patterns is possible using a laser pulse having a longer wavelength. However, this solution depends on the availability of suitable femtosecond laser sources having a wavelength to the infrared of the currently available 800 nm of Ti:Sapphire lasers.

FIG. 6 illustrates an optical system 200 according to the invention for writing waveguides having a larger width by rotating a focal spot 212 around writing axis 210. A pulsed laser beam 220 is passed through polarization sensitive beam splitter 221 and quarter wave plate 222, and focused with long focal length lens 223 onto a rapidly rotating mirror 224. The pulsed laser beam is focused loose enough through the lens 223 to avoid damage to the mirror 224. The mirror 224 is mounted at an angle Φ to the axis of rotation of motor 225 for slightly deflecting the reflected pulsed beam away from the writing axis 210. As the mirror 224 rotates the pulsed beam is rotated around the writing axis 210 at a constant displacement angle. The reflected pulsed beam is re-collimated by the lens 223. The quarter wave plate 222 is set such that the polarization sensitive beamsplitter 221 reflects the recollimated pulsed beam to concave mirror 227 for focusing the pulsed beam into workpiece 226. The angular displacement Θ of the incoming pulsed beam is a function of the lateral displacement of the focus x and the focal length of the focusing element f–Θ=x/f. For a focal length of 50 mm and a displacement of 4 μm in order to extend a waveguide diameter from 8 μm to ~16 μm, Θ is approximately 0.1 mrad. The angle Θ is also determined by the ratio of focal lengths of the lens 223, the concave mirror 227, and the tilt angle Φ of the rotating mirror 224. For the above example, and using a focal length of 1000 mm for the lens 223 the tilt angle Φ of the rotating mirror 224 is approximately 2 mrad, which is easily achieved. Preferably, the rotation of the focus around the writing axis is rapid compared to the exposure time of a particular volume element of the workpiece. Further preferably, the rotation of the focus is done with high precision and repeatability in order to obtain a uniform waveguide.

The optical system 200 for de-magnifying beam direction adjustments to make micron scale changes in the position of a laser focus is not restricted to the rotational motion described in FIG. 6. As is evident, it is possible provide mechanisms for variably adjusting the tilt angle Φ differently in x and y direction and the combination of adjustments in the two directions allow generating of any motion of the focus with respect to the writing axis, for example, generating structures having a rectangular profile. Furthermore, it is possible to adjust the tilt angle Φ during the writing process to produce tapered waveguides and structures having a varying refractive index profile.

Referring to FIG. 7 another optical system 300 according to the invention for writing waveguides having a larger width is shown. A pulsed laser beam 330 is focused with a long focal length lens 331 onto a rapidly rotating mirror 332. The mirror 332 is mounted at an angle Φ to the normal of the axis of rotation 337 of motor 333 for slightly deflecting the reflected pulsed beam away from the writing axis 338. As the mirror 332 rotates the pulsed beam is rotated around the writing axis 338 at a constant displacement angle. The reflected pulsed beam is re-collimated by a second long focal length lens 334. After passing through workpiece 335 the pulsed beam is reflected from concave mirror 336 and focused within the workpiece 335. The angular displacement Θ of the incoming pulsed beam is determined by the ratio of the focal lengths of the lenses 331, 334, and the concave mirror 336, and the tilt angle Φ of the rotating mirror 332.

Both optical systems shown in FIGS. 6 and 7 are also applicable in laser micromachining techniques other than FLDM where fast micron scale adjustments of a laser focus are used.

In case of the FLDM technique non-linear absorption within the material near but not at the focus controls self-focusing of the pulsed laser beam when modifying the material within a workpiece. Close to a surface this inhibting process is not does not exist. Consequently, using FLDM close to surfaces is problematic. A current approach for writing patterns close to a surface is accomplished by writing patterns further inside the workpiece and removing material to a desired depth or by writing close to the surface and removing the damaged material near the surface. However, this adds another processing step of re-polishing of the surface of a workpiece, which is not desirable or even possible.

Figure 8:
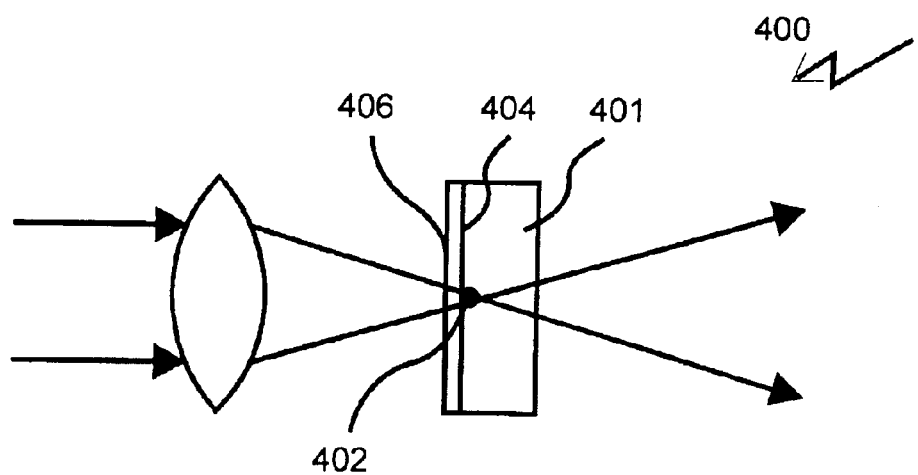
FIG. 8 is a simplified block diagram illustrating an optical arrangement according to the invention for writing optical structures in close proximity to a surface of a workpiece.

This problem is overcome by the optical arrangement 400 according to the invention as illustrated in FIG. 8. Use of a thin sheet 406 of an optically same material optically contacted to workpiece 401 provides the self-inhibiting function for the FLDM process if a laser focal volume 402 is close to surface 404 or even partially outside the workpiece 401. The sheet 406 need to have only the thickness of a few Raleigh lengths of the focus 402, but it is preferred to use a sheet of greater thickness for mechanical stability. The sheet 406 is, for example, directly optically contacted with the workpiece 401 if the surfaces of the sheet 406 and the workpiece 401 are optically flat. Alternatively, a thin film of index matching fluid is interposed between the workpiece and the sheet to provide optical contact. This optical arrangement is highly advantageous for writing waveguide entrances into a workpiece. Furthermore, it enables writing waveguides very close to the surface of a workpiece.

Figure 9:
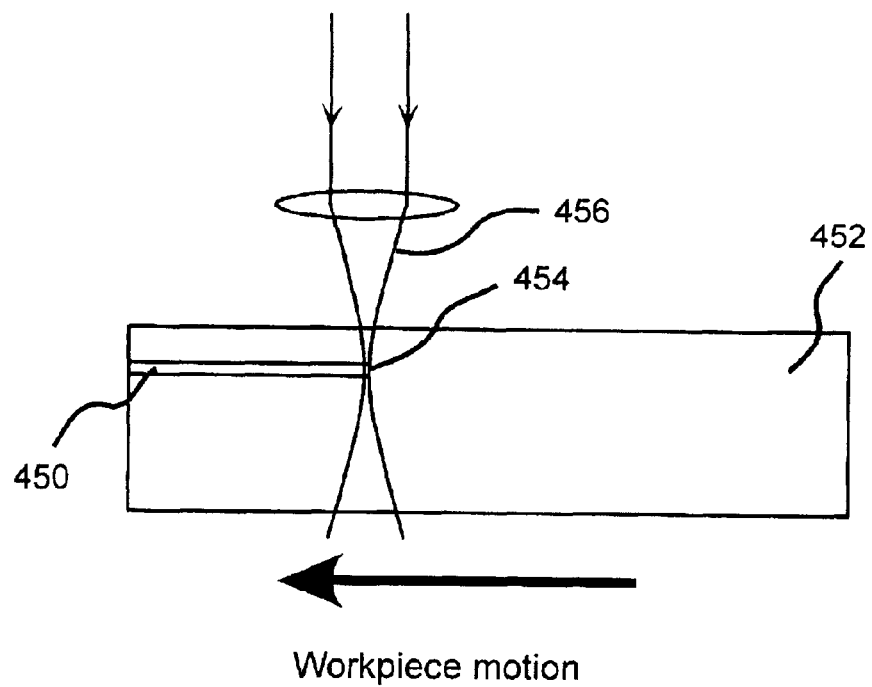
FIG. 9 is a simplified block diagram illustrating writing of an optical structure within a workpiece by moving the workpiece in an orthogonal direction to the laser beam.

In the fabrication of integrated optical components features have to be written such that a laser beam 456 is approximately orthogonal to the writing direction of a waveguide 450, as illustrated in FIG. 9. Here, the problem is to control focal volume 454 defining the waveguide profile and to efficiently use the available laser pulse energy.

For comparison, in writing a waveguide by moving the laser focus along the direction of the laser beam the waveguide profile is determined by the profile of the beam focus, which is controlled by the laser mode.

Figure 10:
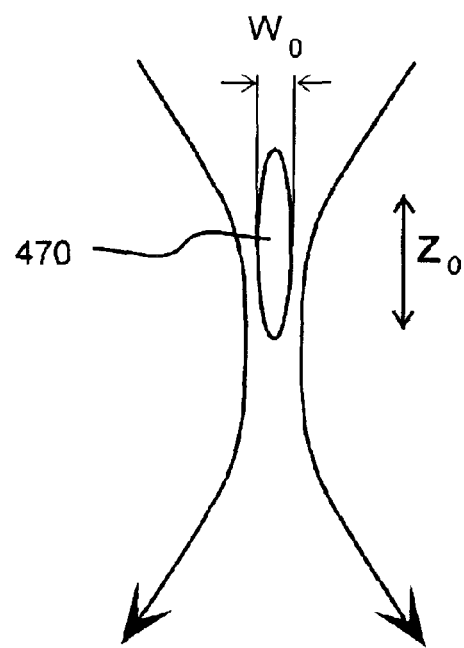
FIG. 10 is a simplified block diagram illustrating a volume element of dielectric modification with respect to a laser beam.

FIG. 10 illustrates a volume element 470 in the focus of a laser beam wherein the material of a workpiece is modified. The volume element 470 has a diameter $\omega_0$ being approximately that of the beam waste and a length being approximately the Raleigh length $z_0$ of the beam focus. For a single mode Gaussian beam $\omega_0$ and $z_0$ are related by $z_0=\pi\omega^2_0/\lambda$ with $\lambda$ being the laser wavelength and $z_0$ always being significantly greater then $\omega_0$. Consequently, in FLDM arrangements where the workpiece is moved orthogonal the laser beam axis the resulting structure will always be highly elliptical in profile. For writing structures on a micron scale it is only possible to reduce $z_0$ to dimensions of a few microns by focussing very tightly. However, this reduces the beam waste diameter correspondingly. With very tight focusing the laser energy has to be reduced in order to avoid exceeding the limit where uncontrollable energy deposition and modification starts to take place. This results in a waste of valuable laser output and in a very inefficient writing process. Furthermore, structures having dimensions larger than $\omega_0$ on an axis orthogonal to both the laser beam and the writing direction are only obtained using multi-pass writing or moving of the laser focus during the writing process.

Figure 11C:
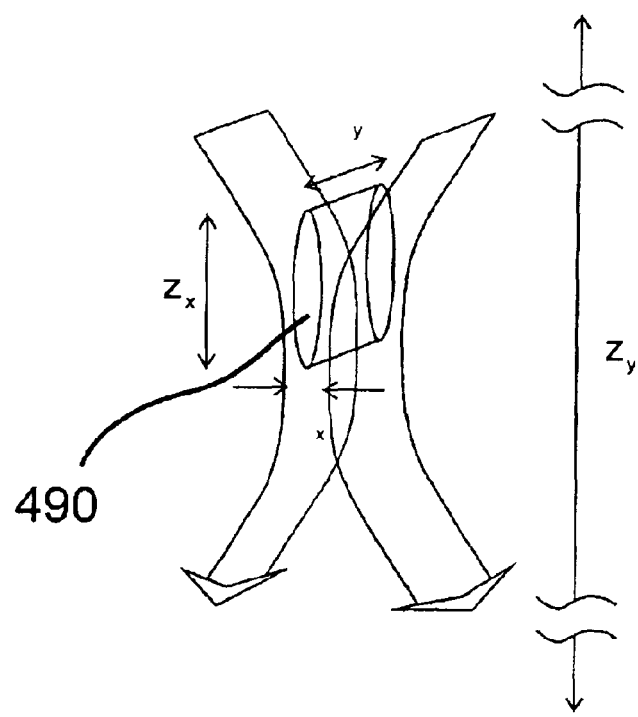
FIG. 11C is a simplified block diagram illustrating a volume element of dielectric modification with respect to a laser beam obtained according to the invention.

FIGS. 11A to 11C illustrate an optical system 500 according to the invention for controlling the laser focus. A laser beam is first passed through a long focal length cylindrical lens 480 producing a line focus 482. A short focal length spherical lens 484 such as a microscope objective is placed just before the focus 482 of the cylindrical lens 480. The result is a line focus 486 having a width close to the diffraction limit of the short focal length lens 484—approximately 5 microns—and a length being determined by the focal length of the cylindrical lens 480—approximately 50 microns. FIG. 11C illustrates the resulting volume element 490 wherein the material of a workpiece is modified. Therefore, the dimensions $\omega_x$, $\omega_y$, and $z_x$ of the volume element 490 are determined for a given laser wavelength by the combination of the cylindrical lens 480 and the spherical lens 484. This allows producing a predetermined volume element 490 having a ratio $z_x/\omega_x$ that is substantially smaller than the ratio $z_0/\omega_0$ of volume element 470 shown in FIG. 10 resulting in a substantially more efficient writing process. For example, the focal length of the spherical lens 484 is chosen to obtain a predetermined $z_x$ and the focal length of the cylindrical lens 480 is chosen such that the intensity in the focus is below the limit uncontrolled energy deposition. As is evident to a person of skill in the art it is also possible to use other optical arrangements for obtaining a predetermined volume element 490. However, the optical system shown in FIGS. 11A and 11B is the simplest way to produce the desired result.

Figure 12:
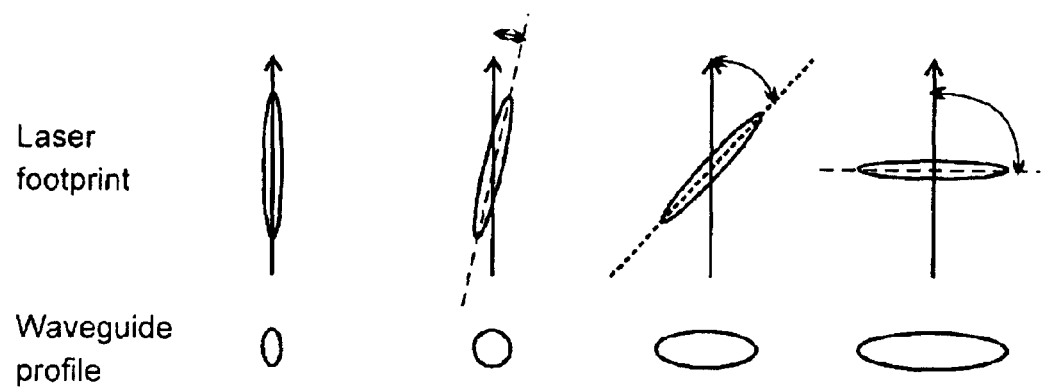
FIG. 12 is a simplified block diagram illustrating an obtained waveguide profile in dependence upon the angle between the writing axis and the axis of the laser beam; and, FIG. 13 is a simplified flow diagram of a method according to the invention for manufacturing integrated optical devices.

FIG. 12 illustrates schematically different waveguide profiles in dependence upon the angle $\Theta$ between the axis of the shaped laser focus and the writing direction. By adjusting the angle $\Theta$ it is possible to adjust the profile the laser focus projects onto the plane orthogonal to the writing direction and hence the profile of the resulting refractive index change. Waveguides having various profiles are obtained by simply choosing the appropriate value for $\Theta$ and adjusting the writing speed to deliver a desired energy density. Furthermore, by rotating the cylindrical lens 480 during the writing process and adjusting the pulse rate of the pulsed laser beam accordingly it is possible to manufacture tapered waveguides and other structures having profiles varying with length. As is evident, this manufacturing process also allows automatization using computer control.

Figure 13:
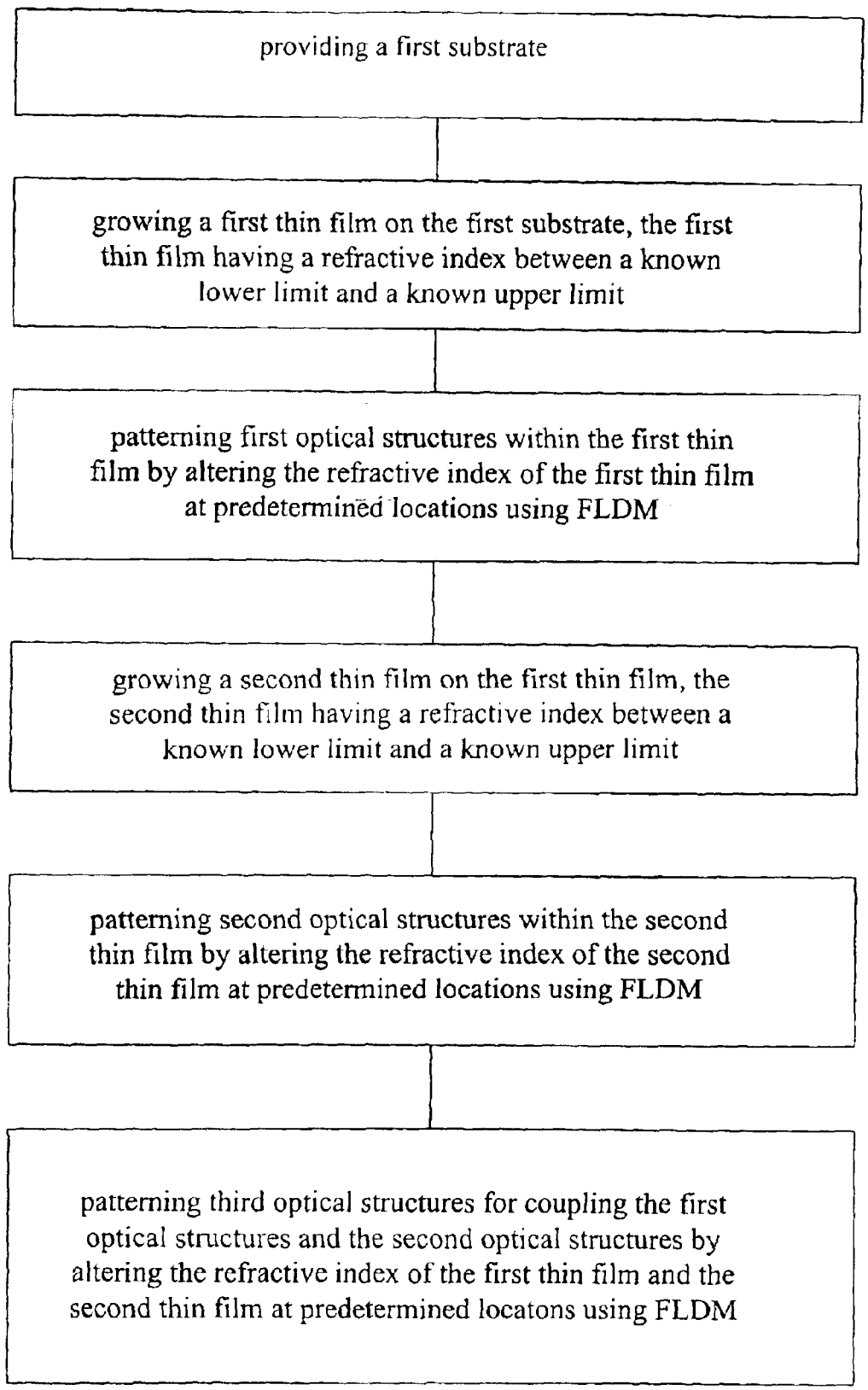

It is known that material selection influences the effectiveness of FLDM. For example in pure $SiO_2$ the change in n is typically less than 1%. However if $SiO_2$ is doped with Ge changes as high as 4% are achieved. In many instances the incorporation of a dopant is not desirable, particularly if the doped material is used to perform more than one function. Referring to FIG. 13 a method for manufacturing integrated optical devices according to the invention is shown. In thin film technology it is known to use growth conditions to tune the refractive index of a thin film. For example, adjusting growth conditions allows producing a layer comprising both SiO and $SiO_2$. It is possible to adjust the growth process to produce vacancies in the lattice. Depending upon the ratio of the two oxides and vacancies the refractive index of the as grown film varies between a known lower limit and a known upper limit, for example, ±12% around a central value. The method according to the invention exploits the growth process. That is, a mixed layer is grown to produce a film of a predetermined refractive index. The FLDM process is then used to increase the refractive index towards the possible upper refractive index limit of the film in a localized area forming, for example, the high refractive index guiding core of a waveguide. Alternatively the FLMD process is used to reduce the refractive index in a predetermined geometry to produce a region bounded by that predetermined geometry whose refractive index is unchanged from the as grown value. This also results in an index guiding core. Numerous growth methods are applicable to produce the mixed layer such as Flame Hydrolysis Deposition (FHD), Chemical Vapour Deposition (CVD), Plasma Enhanced Chemical Vapour Deposition PECVD, Molecular Beam Epitaxy (MBE) and Ion Planting are but a subset of such growth methods. Using this two-phase fabrication method based on thin film growth and FLDM allows for creating 3D integrated optical circuits. Generally speaking, this method is comparable epitaxy fabrication methods in electronics. In epitaxy fabrication methods thin film growth is followed by another fabrication step, for example, lithography, which is then followed by another growth cycle. This process is then repeated many times to produce fully integrated electronic devices on a same wafer. Here, growth steps are followed by steps fabricating structures within the just grown layer using FLDM followed by another growth step. The process is then repeated to produce a fully integrated optical device.

For example, a first layer exhibiting optical gain within a waveguide is deposited. A waveguide forming a spiral amplifier is then fabricated within this first layer using FLDM. A following layer able to produce passive elements is then deposited. A following fabrication step comprises fabrication of the passive elements such as Array Waveguide Gratings (AWG) used in DWDM and writing of a third type of waveguide between the two layers linking the active and the passive components of the integrated device using FLDM. The example given is specific to wavelength multiplexing and demultiplexing. Anyone skilled in the art will know that the method according to the invention is applicable to any device, which is designed to perform a specified optical function such as performing an all-optical logic function.

Optionally, combination of the fabrication steps of the method according to the invention with the fabrication steps for fabricating electronic circuits allows manufacture of fully integrated opto-electronic devices grown on a same wafer.

Numerous other embodiments of the invention will be apparent to persons skilled in the art without departing from the spirit and scope of the invention as defined in the appended claims.

What is claimed is:

1. A method for writing an optical structure having a predetermined profile within a workpiece of a dielectric material using FLDM comprising:

providing an optical system for focusing a laser beam such that a predetermined volume element of dielectric modification within the dielectric material is obtained;

providing the workpiece at a predetermined location such that the focus of the laser beam is located within the workpiece;

providing a femtosecond laser beam; and, providing rejative movement between the workpiece and the focus of the laser beam, wherein an angle Θ between the direction of the movement and the direction of the laser beam is determined such that the predetermined profile of the optical structure is obtained.

2. A method for writing an optical structure having a predetermined profile within a workpiece of a dielectric material using FLDM as defined in claim 1, wherein the optical system comprises a long focal length cylindrical lens and a short focal length spherical lens positioned just in front of the focus of the cylindrical lens.

3. A method for writing an optical structure having a predetermined profile within a workpiece of a dielectric material using FLDM as defined in claim 2, wherein the dimensions of the predetermined volume element are determined by the combination of the cylindrical lens and the spherical lens.

4. A method for writing an optical structure having a predetermined profile within a workpiece of a dielectric material using FLDM as defined in claim 3, wherein the speed of the relative movement is adjusted to achieve a desired energy density.

5. A method for writing an optical structure having a predetermined profile within a workpiece of a dielectric material using FLDM as defined in claim 3, comprising the step of rotating the cylindrical lens.

6. A method for writing an optical structure according to claim 1 comprising:

providing a drive mechanism for supporting the relative movement between the workpiece and the focus of the laser beam, wherein the optical system comprises a focussing optical element and, a reflective optical element for reflecting the laser beam onto the focusing optical element, the reflective optical element being movable for providing a predetermined movement of the focus of the laser beam in at least one direction with respect to the workpiece.

7. A method for writing an optical structure according to claim 6 disposing the reflective optical clement for reflecting the laser beam onto the focusing optical element, the reflective optical element being movable for providing a predetermined movement of the focus of the laser beam in at least one direction with respect to the workpiece.

8. A method for writing an optical structure according to claim 7, wherein the drive mechanism comprises a motor rotating an axis and wherein the reflective optical element is mounted onto same at a predetermined tilt angle for providing a rotational movement of the focus.

9. A method for writing an optical structure according to claim 8, wherein the rotational movement of the focus is rapid compared to the exposure time of a volume element.

10. A method for writing an optical structure according to claim 9, wherein the tilt angle is changed during the writing process.

* * * * *